(12) United States Patent
Ishida et al.

(10) Patent No.: US 10,257,369 B2
(45) Date of Patent: Apr. 9, 2019

(54) DRIVING DEVICE AND IMAGE FORMING APPARATUS INCLUDING SAME

(71) Applicants: Masahiro Ishida, Kanagawa (JP); Naoki Matsuda, Kanagawa (JP)

(72) Inventors: Masahiro Ishida, Kanagawa (JP); Naoki Matsuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 473 days.

(21) Appl. No.: 14/950,318

(22) Filed: Nov. 24, 2015

(65) Prior Publication Data

US 2016/0156247 A1 Jun. 2, 2016

(30) Foreign Application Priority Data

Nov. 27, 2014 (JP) .................. 2014-240344

(51) Int. Cl.
| | | |
|---|---|---|
| *H02K 1/04* | (2006.01) | |
| *H04N 1/00* | (2006.01) | |
| *H02K 7/14* | (2006.01) | |
| *H02K 21/22* | (2006.01) | |
| *H02K 11/22* | (2016.01) | |

(52) U.S. Cl.
CPC .............. *H04N 1/00* (2013.01); *H02K 7/14* (2013.01); *H02K 11/22* (2016.01); *H02K 21/22* (2013.01)

(58) Field of Classification Search
CPC ...................................... H04N 1/00
USPC ....................................... 310/43
See application file for complete search history.

(56) References Cited

U.S. PATENT DOCUMENTS

| | | | |
|---|---|---|---|
| 2007/0242974 A1* | 10/2007 | Saito .............. | G03G 21/1604 399/107 |
| 2008/0069635 A1 | 3/2008 | Maehata et al. | |
| 2008/0089713 A1 | 4/2008 | Ishida et al. | |
| 2010/0239318 A1 | 9/2010 | Maehata et al. | |
| 2011/0170892 A1 | 7/2011 | Ishida et al. | |
| 2012/0046142 A1* | 2/2012 | Miyawaki ........... | G03G 15/757 475/331 |
| 2012/0060633 A1 | 3/2012 | Ishida et al. | |
| 2014/0270851 A1 | 9/2014 | Matsuda et al. | |
| 2015/0060191 A1 | 3/2015 | Matsuda et al. | |
| 2015/0110517 A1 | 4/2015 | Ishida et al. | |

FOREIGN PATENT DOCUMENTS

| | | |
|---|---|---|
| JP | H11311302 A | 11/1999 |
| JP | 2002-099124 | 4/2002 |
| JP | 2007-129856 A | 5/2007 |

(Continued)

OTHER PUBLICATIONS

Office Action for Corresponding Japanese Patent Application No. 2014-240344 dated Jun. 29, 2018.

*Primary Examiner* — Jianchun Qin
(74) *Attorney, Agent, or Firm* — Harness, Dickey & Pierce, P.L.C.

(57) ABSTRACT

A driving device includes an exterior cover, a drive source, a drive source mount, a drive transmitter, and a rotor cover. The drive source includes a rotor and a stator disposed in the rotor. The drive source mount is disposed between the drive source and the exterior cover, to mount the drive source. The drive transmitter transmits a drive force from the drive source to a rotator. The rotor cover covers a periphery of the rotor.

33 Claims, 7 Drawing Sheets

(56) References Cited

FOREIGN PATENT DOCUMENTS

| | | |
|---|---|---|
| JP | 2008-068629 | 3/2008 |
| JP | 2012-063008 A | 3/2012 |
| JP | 2014-160223 | 9/2014 |
| JP | 2015-184640 A | 10/2015 |

* cited by examiner

DRIVING DEVICE AND IMAGE FORMING APPARATUS INCLUDING SAME

CROSS-REFERENCE TO RELATED APPLICATION

This patent application is based on and claims priority pursuant to 35 U.S.C. § 119(a) to Japanese Patent Application No. 2014-240344, filed on Nov. 27, 2014 in the Japan Patent Office, the entire disclosure of which is hereby incorporated by reference herein.

BACKGROUND

Technical Field

Aspects of this disclosure relate to a driving device and an image forming apparatus including the driving device.

Description of the Related Art

Image forming apparatuses are used as, for example, copiers, printers, facsimile machines, or multifunction peripherals having the foregoing capabilities. Such image forming apparatuses may include multiple driving devices for image forming operation to drive a photoconductor, a transfer belt, and so on.

For example, for an image forming apparatus, a motor mount plate to mount a motor is disposed between the motor and an exterior cover.

SUMMARY

In an aspect of this disclosure, there is provided a driving device including an exterior cover, a drive source, a drive source mount, a drive transmitter, and a rotor cover. The drive source includes a rotor and a stator disposed in the rotor. The drive source mount is disposed between the drive source and the exterior cover, to mount the drive source. The drive transmitter transmits a drive force from the drive source to a rotator. The rotor cover covers a periphery of the rotor.

In another aspect of this disclosure, there is provided an image forming apparatus including the driving device.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1:
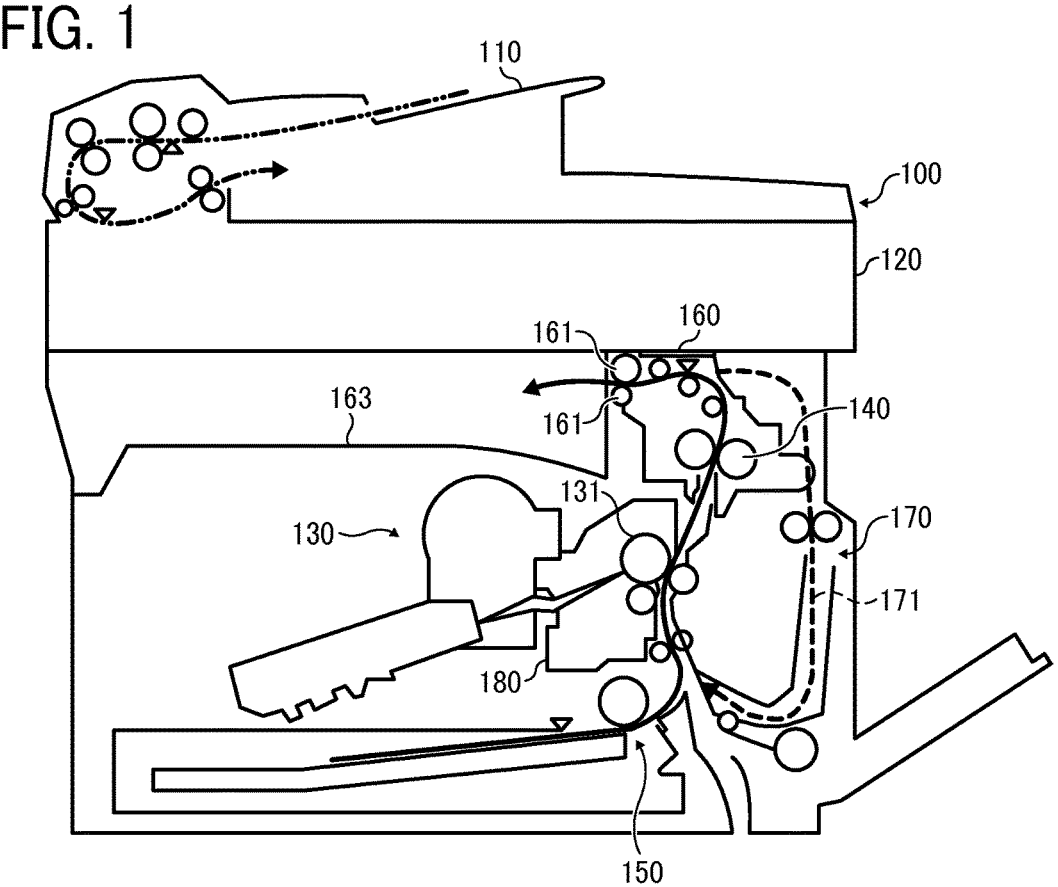
FIG. 1 is a schematic view of a configuration of an image forming apparatus including a driving device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Below, embodiments of the present disclosure are described with reference to attached drawings. FIG. 1 is a schematic view of a configuration of an image forming apparatus 100 including a driving device according to an embodiment of the present disclosure. As illustrated in FIG. 1, the image forming apparatus 100 includes an automatic document feeder (ADF) 110, a reading device 120, an image forming device 130, a fixing device 140, a sheet feeding device 150, a sheet ejection device 160, and a sheet refeeding device 170.

In this embodiment, the ADF 110 includes a document feeding mechanism compatible with sheet-through reading. The reading device 120 reads an original document fed by the ADF 110 to a reading position.

The image forming device 130 includes, e.g., a process unit 180, an optical writing unit, and a transfer unit. The process unit 180 includes, e.g., a photoconductor 131, an electric charger, a developing unit, a cleaning unit, and an electric discharging unit. In other words, the image forming device 130 uses an optical writing unit to form a latent image on the photoconductor 131 to which electric potential is applied with the electric charger. The developing unit supplies toner to the photoconductor 131 to make the latent image visible as a toner image on the photoconductor 131, and the transfer unit transfers the toner image from the photoconductor 131 onto a recording sheet. The cleaning unit removes untransferred residual toner on the photoconductor 131, and the electric discharging unit returns residual potential remaining on a surface of the photoconductor 131 to zero.

The fixing device 140 includes a fixing roller pair including a pair of a pressure roller and a heat roller. The sheet feeding device 150 picks up recording sheets sheet by sheet from a sheet feed tray and feeds the recording sheets toward the transfer unit. The sheet ejection device 160 ejects a recording sheet conveyed from the fixing device 140 onto a sheet ejection tray 163 and also can switchback a recording sheet toward the sheet refeeding device 170. In other words, the sheet ejection device 160 includes a pair of sheet ejection rollers 161. When a sheet ejection sensor detects a nipped state in which an edge of a recording sheet is interposed between the pair of sheet ejection rollers 161, the sheet ejection device 160 rotates the pair of sheet ejection rollers 161 in reverse to feed the recording sheet to the sheet refeeding device 170.

The recording sheet, which has the toner image formed by the image forming device 130 and is interposed between the pair of sheet ejection rollers 161 in the nipped state, is delivered to the image forming device 130 by the sheet refeeding device 170 via a switchback path 171 indicated by a broken line in FIG. 1. Thus, the recording sheet is fed to the image forming device 130 in an orientation in which a toner image can be transferred onto a back face of the recording sheet.

The process unit 180 is removably mountable relative to the image forming device 130. Integrating, e.g., the photoconductor 131, the electric charger, the developing unit, the cleaning unit, the electric discharging unit as a single unit facilitates replacement and maintenance works. Such a configuration also allows the relative positions between components to be maintained at high accuracy, thus enhancing resultant image quality.

Figure 2:
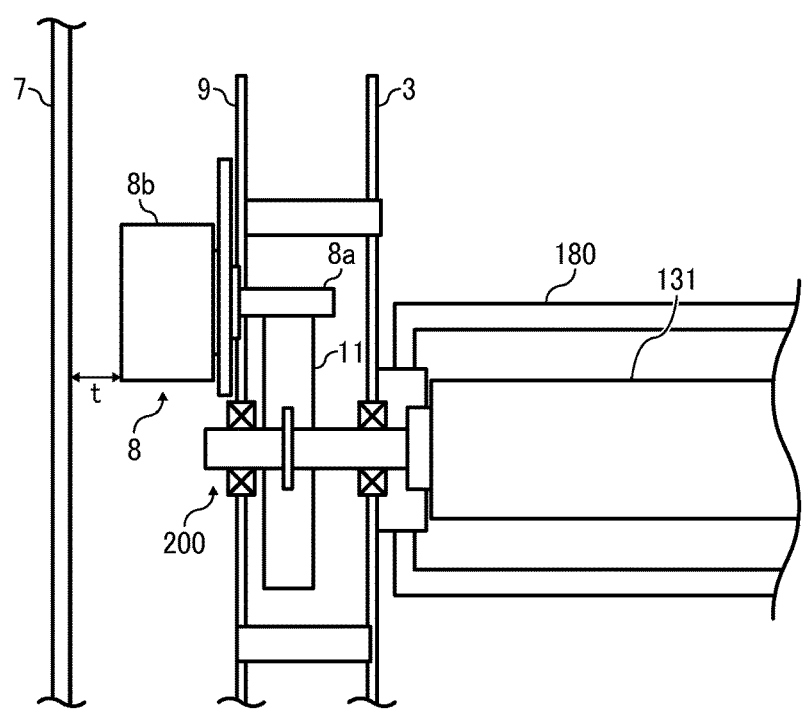
FIG. 2 is a schematic view of a driving device according to a comparative example.

FIG. 2 is a schematic view of a comparative example of a driving device 200 to drive the photoconductor 131. The driving device 200 according to the comparative example includes a drive motor 8, and a photoconductor gear 11 to engage a gear portion of a motor shaft 8a of the drive motor 8. The drive motor 8 is mounted on a motor mount bracket 9. The motor mount bracket 9 is mounted on a body side plate 3. In this embodiment, an outer-rotor-type brushless motor having an advantage of less uneven rotation is used as the drive motor 8 to drive the photoconductor 131. The outer-rotor-type brushless motor has a configuration in which a rotor 8b to rotate with the motor shaft 8a is exposed.

For the comparative example of the driving device 200, as illustrated in FIG. 2, the photoconductor gear 11, the motor mount bracket 9, and the drive motor 8 are arranged in this order from an inner side of the driving device 200, and the drive motor 8 opposes an exterior cover 7. In such a configuration, during driving of the drive motor 8, noise might leak to the outside from the exterior cover 7 and may result in a failure of insufficient quietness of the drive motor 8.

Alternatively, if the exterior cover 7 is pressed and dented inward to contact the rotor 8b of the drive motor 8, the rotation of the rotor 8b might be disturbed. Hence, for the comparative example, a sufficient size of clearance t is set between the drive motor 8 and the exterior cover 7 so that the exterior cover 7 does not contact the rotor 8b of the drive motor 8 even if the exterior cover 7 is dented. As a result, however, such a sufficient size of clearance increases the size of the driving device 200. Hence, a driving device according to an embodiment of this disclosure has a configuration of effectively reducing the noise of the drive motor 8 leaked to the outside and the size of the driving device. Below, embodiments of this disclosure are described with reference to FIGS. 3 through 9.

Figure 3:
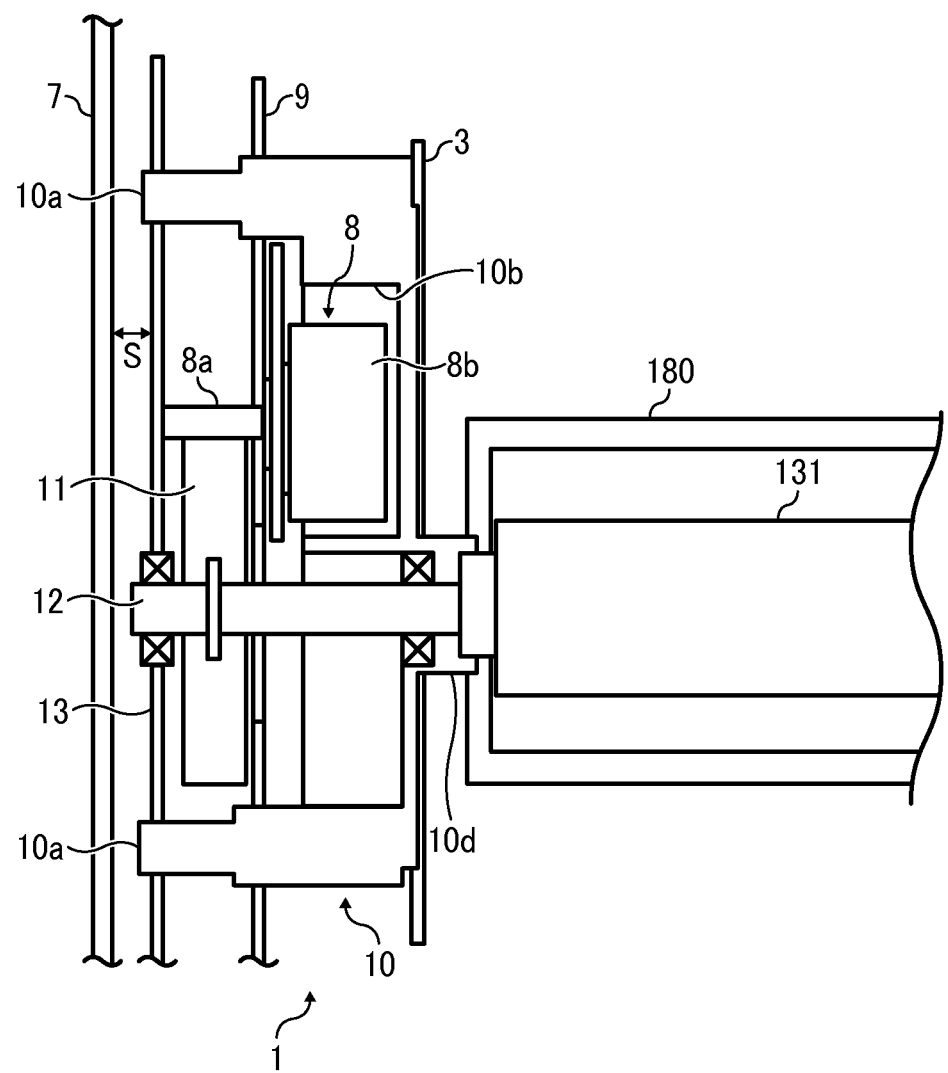
FIG. 3 is a schematic view of a driving device according to an embodiment of the present disclosure.
Figure 4:
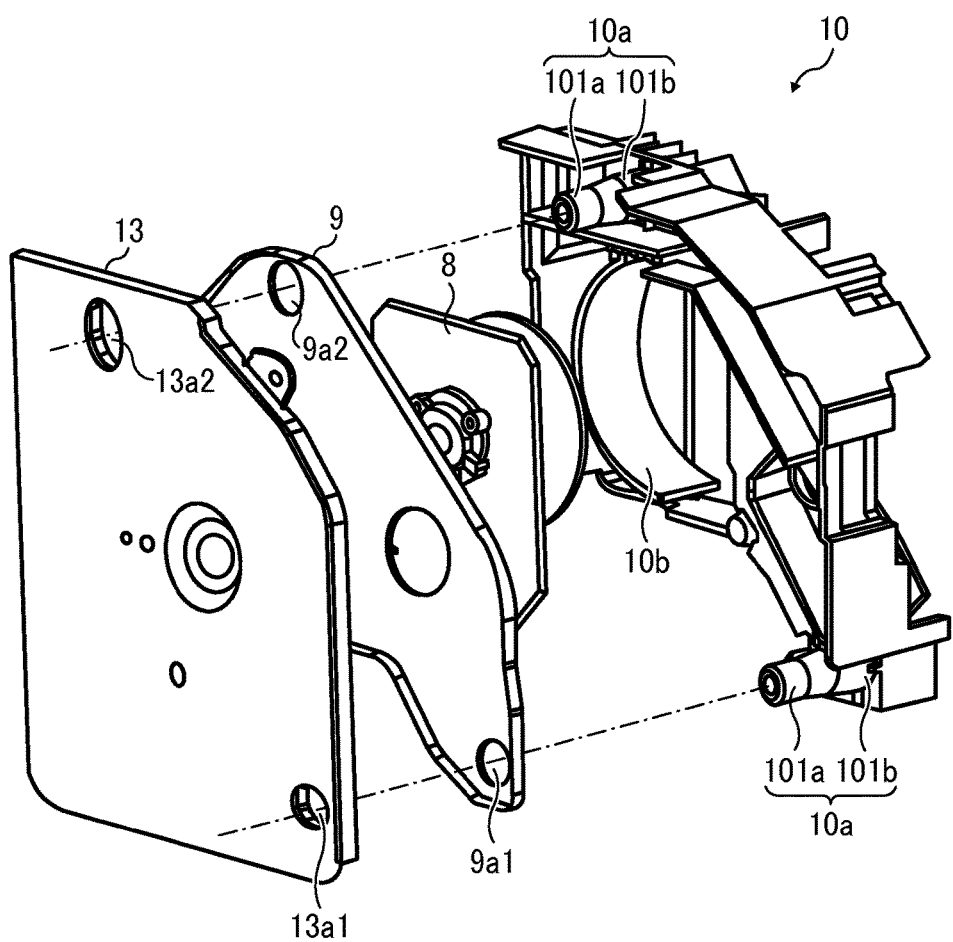
FIG. 4 is an exploded perspective view of the driving device.

FIG. 3 is a schematic view of a configuration of a driving device 1 according to an embodiment of this disclosure. FIG. 4 is an exploded perspective view of the driving device 1 of FIG. 3. In the driving device 1 according to this embodiment, a mold holder 10 serving as a rotor cover, a drive motor 8, a motor mount bracket 9, a photoconductor gear 11, a drive holding bracket 13 serving as a drive transmitter opposing member are arranged in this order from an inner side of the driving device 1.

The mold holder 10 is made of resin and formed by molding, such as injection molding. Each of the motor mount bracket 9 and the drive holding bracket 13 is made of metal plate. The mold holder 10 is mounted on the body side plate 3 electrically grounded. Such a configuration suppresses accumulation of electricity in the mold holder 10 and occurrence of electric discharge between the mold holder 10 and the drive motor 8. The mold holder 10 includes a unit positioning portion 10d to position the process unit 180 relative to a device body of the driving device 1 with the process unit 180 mounted to the mold holder 10.

The photoconductor gear 11 is secured to a drive shaft 12 that is rotatably supported with the drive holding bracket 13 and the mold holder 10 via a bearing. The drive shaft 12 penetrates a central portion of each of the motor mount bracket 9 and the unit positioning portion 10d, and is connected to the photoconductor 131 in the process unit 180 via a coupling to drive the photoconductor 131.

As illustrated in FIG. 4, the mold holder 10 has a motor shield 10b at a substantially central portion to enclose and shield the rotor 8b of the drive motor 8. The mold holder 10 has positioning projections 10a at an upper left portion and a lower right portion in FIG. 4 to position the motor mount bracket 9 and the drive holding bracket 13. The positioning projection 10a has a holding bracket positioner 101a at a projecting end thereof to position the drive holding bracket 13. The positioning projection 10a has a mount bracket positioner 101b at a bottom side to position the motor mount bracket 9. The diameter of the mount bracket positioner 101b at the bottom side is greater than the diameter of the holding bracket positioner 101a at the projecting side.

The motor mount bracket 9 includes a sub-reference positioning hole 9a2 of a long hole shape at an upper portion thereof and a main-reference positioning hole 9a1 of a round hole shape at a lower portion thereof. The main-reference positioning hole 9a1 has a diameter substantially equal to the diameter of the mount bracket positioner 101b. The sub-reference positioning hole 9a2 is a long hole extending parallel to a line connecting a center of one of the positioning projections 10a and a center of the other of the positioning projections 10a. The sub-reference positioning hole 9a2 has a short shaft diameter substantially equal to the diameter of the mount bracket positioner 101b. When positioning holes 9a1 and 9a2 of the motor mount bracket 9 are fitted in the mount bracket positioner 101b, the motor mount bracket 9 is positioned to the mold holder 10.

Like the motor mount bracket 9, the drive holding bracket 13 includes a sub-reference positioning hole 13a2 of a long hole shape at an upper portion thereof and a main-reference positioning hole 13a1 of a round hole shape at a lower portion thereof. The main-reference positioning hole 13a1 has a diameter substantially equal to the diameter of the holding bracket positioner 101a. The sub-reference positioning hole 13a2 is a long hole extending parallel to a line connecting a center of one of the positioning projections 10a and a center of the other of the positioning projections 10a. The sub-reference positioning hole 13a2 has a short shaft diameter substantially equal to the diameter of the holding bracket positioner 101a. When positioning holes 13a1 and 13a2 of the drive holding bracket 13 are fitted in the holding bracket positioner 101a, the drive holding bracket 13 is positioned to the mold holder 10.

In this embodiment, as described above, the drive holding bracket 13 and the motor mount bracket 9 are positioned to the mold holder 10. In comparison with a configuration in which the drive holding bracket 13 and the motor mount bracket 9 are positioned to separate members, such a configuration suppresses a reduction in accuracy due to accumulation of tolerances of components. The drive shaft 12 supporting the photoconductor gear 11 is held with both the mold holder 10 and the drive holding bracket 13 accurately positioned by the drive holding bracket 13. Such a configuration allows the drive shaft 12 to be held with no inclination, thus allowing good engagement of the gear portion of the motor shaft 8a with the photoconductor gear 11. Accordingly, for example, engagement noise can be suppressed, thus further enhancing the quietness of the driving device. In addition, drive transmission from the drive shaft 12 to the photoconductor 131 can be effectively performed, thus suppressing fluctuations in the speed of the photoconductor 131 due to the inclination of the drive shaft 12.

Further, the motor mount bracket 9 is accurately positioned to the mold holder 10, thus allowing the gear portion of the motor shaft 8a of the drive motor 8 mounted on the motor mount bracket 9 to effectively engage the photoconductor gear 11. Such a configuration suppresses, for example, engagement vibration and engagement noise.

Figure 5A:
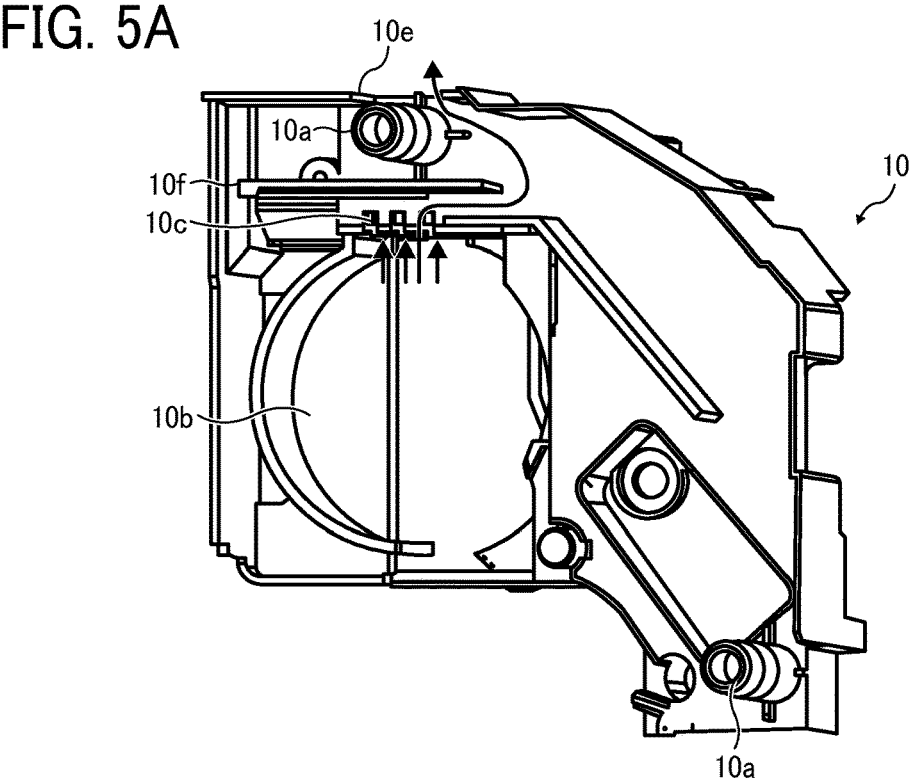
FIGS. 5A and 5B are exploded perspective views of a mold holder of the driving device.
Figure 5B:
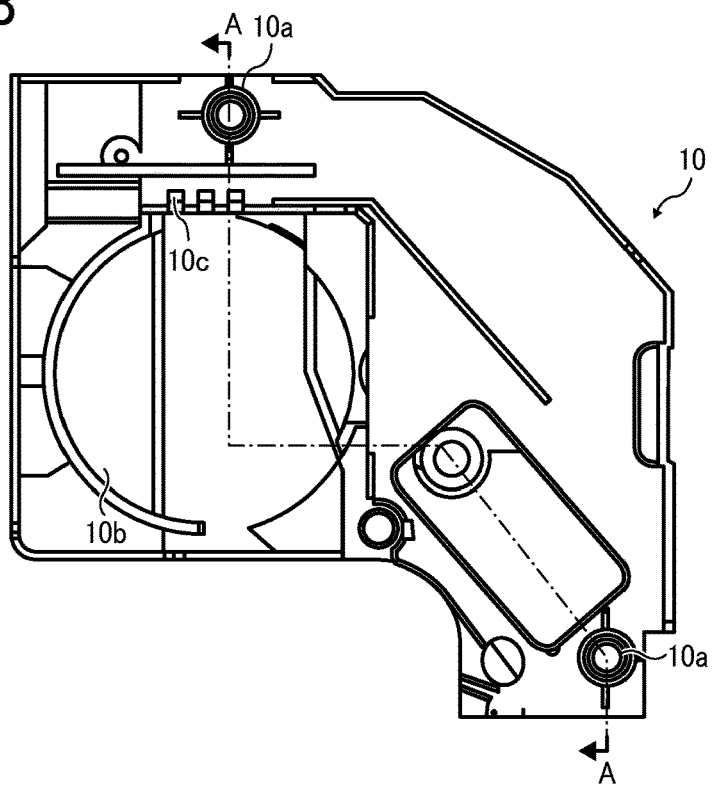

FIG. 5A is a perspective view of the mold holder 10. FIG. 5B is a front view of the mold holder 10. Noted that FIG. 3 is a cross-sectional view of the mold holder 10 cut along line A-A of FIG. 5B. Waste heat openings 10c to exhaust heat of the drive motor 8 are disposed at an upper portion of the motor shield 10b of the mold holder 10. At an upper portion of the mold holder 10 is also disposed a cutout portion 10e to exhaust neat of the drive motor 8. A shield plate 10f is disposed to cross a space between the cutout portion 10e for waste heat and the motor shield 10b. Accordingly, as indicated by arrows in FIG. 5A, a waste heat path from the motor shield 10b to the cutout portion 10e for waste heat has a labyrinth structure to wind around.

Figure 6:
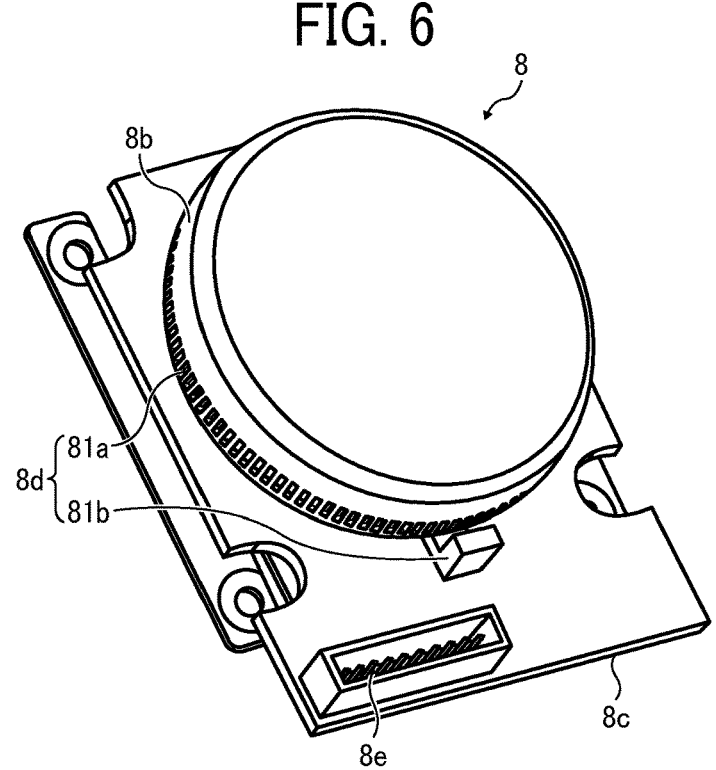
FIG. 6 is a perspective view of a front side of a drive motor of the driving device.
Figure 7:
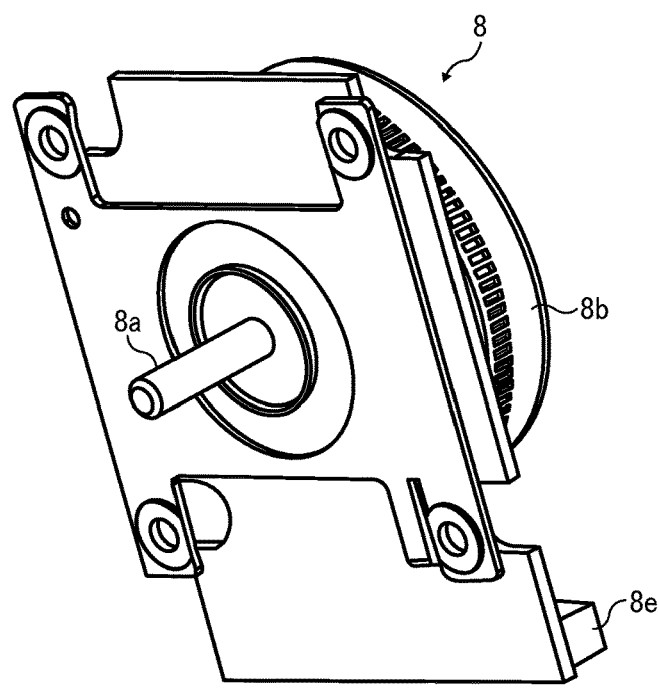
FIG. 7 is a perspective view of a back side of the drive motor.

FIG. 6 is a perspective view of a front side of the drive motor 8. FIG. 7 is a perspective view of a rear side of the drive motor 8. In this embodiment, an outer-rotor-type brushless motor is used as the drive motor 8. The drive motor 8 includes a motor encoder d. The motor encoder 8d includes a code rotor 81a and an optical sensor 81b. The code rotor 81a includes multiple slits on the rotor 8b being a cup-shaped rotator. The optical sensor 81b is a reflective photosensor on a control board 8c to detect the slits of the code rotor 81a.

The rotation angle of the rotor 8b is detected with the motor encoder 8d, and coils being stators inside the rotor 8b are switched in turn with a driver circuit to rotate the rotor 8b. When the rotor 8b is rotated, the motor shaft 8a mounted with the rotor 8b to penetrate the control board 8c is rotated. Note that the control board 8c includes a connector 8e.

The outer-rotor-type brushless motor has a stable rotating performance. Using the outer-rotor-type brushless motor as the drive motor 8 allows the photoconductor 131 to be effectively rotated at a constant speed.

In this embodiment, at least two components, e.g., the motor mount bracket 9 and the drive holding bracket 13 are disposed between the drive motor 8 and the exterior cover 7. Accordingly, noise of the drive motor 8 transmits at least three members, e.g., the motor mount bracket 9, the drive holding bracket 13, and the exterior cover 7. Such noise decays when transmitting each member. Thus, motor noise is sufficiently decayed with the three members, suppressing noise of the drive motor 8. Such a configuration allows noise reduction of the driving device.

In this embodiment, the drive holding bracket 13 and the motor mount bracket 9 are made of metal materials. The higher the density of such members, the more effectively is noise insulated. In this embodiment, the drive holding bracket 13 and the motor mount bracket 9 are made of metal materials having higher densities than resin materials. Such a configuration enhances the noise insulation in comparison with a configuration in which the drive holding bracket 13 and the motor mount bracket 9 are made of resin materials.

Noise of the driving motor 8 also includes noise caused by rotation of the rotor 8b. In this embodiment, the outer-rotor-type brushless motor is used as the drive motor 8, and the rotor 8b is exposed. Accordingly, noise during rotation of the rotor 8b spreads around without being blocked with a component of the drive motor 8. A part of such noise toward the exterior cover 7 is sufficiently decayed by the motor mount bracket 9 and the drive holding bracket 13, thus reducing noise leaking from the exterior cover 7. However, noise toward other areas than the exterior cover 7 may leak out from the image forming apparatus without being sufficiently decayed inside the image forming apparatus, resulting in harsh motor noise.

However, in this embodiment, the rotor 8b of the drive motor 8 is enclosed with the motor shield 10b of the mold holder 10, that is, the rotor 8b is surrounded with the motor shield 10b. Such a configuration allows noise toward other areas than the exterior cover 7 of the rotor 8b to be blocked with the motor shield 10b, thus further enhancing the quietness of the driving device.

Further, in this embodiment, the drive holding bracket 13 is disposed between the exterior cover 7 and the drive transmitter including the gear portion of the motor shaft and the photoconductor gear 11. Such a configuration allows noise, such as engagement noise, of the drive transmitter to be blocked with the drive holding bracket 13, thus reducing leakage of noise from the exterior cover 7 and further enhancing the quietness of the driving device.

Even when the exterior cover 7 is pressed and dented inward, the exterior cover 7 contacts the drive holding bracket 13, thus preventing the exterior cover 7 from contacting the motor shaft 8a and the photoconductor gear 11. Accordingly, stable drive transmission is performed. Without the drive holding bracket 13, a sufficient size of clearance would be set so that the exterior cover 7 does not contact the motor shaft 8a and the photoconductor gear 11 when the exterior cover 7 is pressed and dented inward. By contrast, in this embodiment, the drive holding bracket 13 is a member which the exterior cover 7 contacts when the exterior cover 7 is pressed and dented inward. Accordingly, even if the exterior cover 7 contacts the drive holding bracket 13, driving of the driving device 1 is not affected. Such a configuration sufficiently reduces the size of a clearance S between the exterior cover 7 and the drive holding bracket 13, thus allowing downsizing of the driving device.

In the configuration in which the rotor 8b of the drive motor 8 is covered with the motor shield 10b of the mold holder 10, heat from electronic components mounted on the control board 8c of the drive motor 8 and the bearings of the drive motor 8 might accumulate in the motor shield 10b. Consequently, such accumulated heat might raise the temperature of the motor and hamper stable driving. However, in this embodiment, the waste heat openings 10c allow heat of the drive motor 8 to be exhausted from the waste heat openings 10c, thus preventing the drive motor 8 from being heated to high temperature.

As illustrated in FIGS. 5A and 5B, in this embodiment, the waste heat openings 10c are relatively small, and heat of the drive motor 8 might be fully exhausted from the waste heat openings 10c. However, if the waste heat openings 10c are relatively large, noise of the drive motor 8 might leak from the waste heat openings 10c, thus hampering sufficient quietness. Hence, in this embodiment, as illustrated in FIGS. 5A and 5B, the cutout portion 10e for waste heat is disposed at an upper portion of the mold holder 10, and the shield plate 10f is disposed so as to cross a space between the cutout portion 10e and the motor shield 10b. Thus, the waste heat path from the motor shield 10b to the cutout portion 10e for waste heat has a labyrinth structure. Heat from the drive motor 8 not exhausted from the waste heat openings 10c moves upward and impinge against the shield plate 10f. Heat impinging against the shield plate 10f moves to an end of the shield plate 10f along the shield plate 10f, moves upward from the end, and is exhausted from the cutout portion 10e for waste heat. Noise of the drive motor 8 is blocked with the shield plate 10f, thus preventing the noise from leaking from the cutout portion 10e. Such a configuration secures excellent heat radiation and noise insulation.

Next, a variation of the driving device is described below.

First Variation

Figure 8:
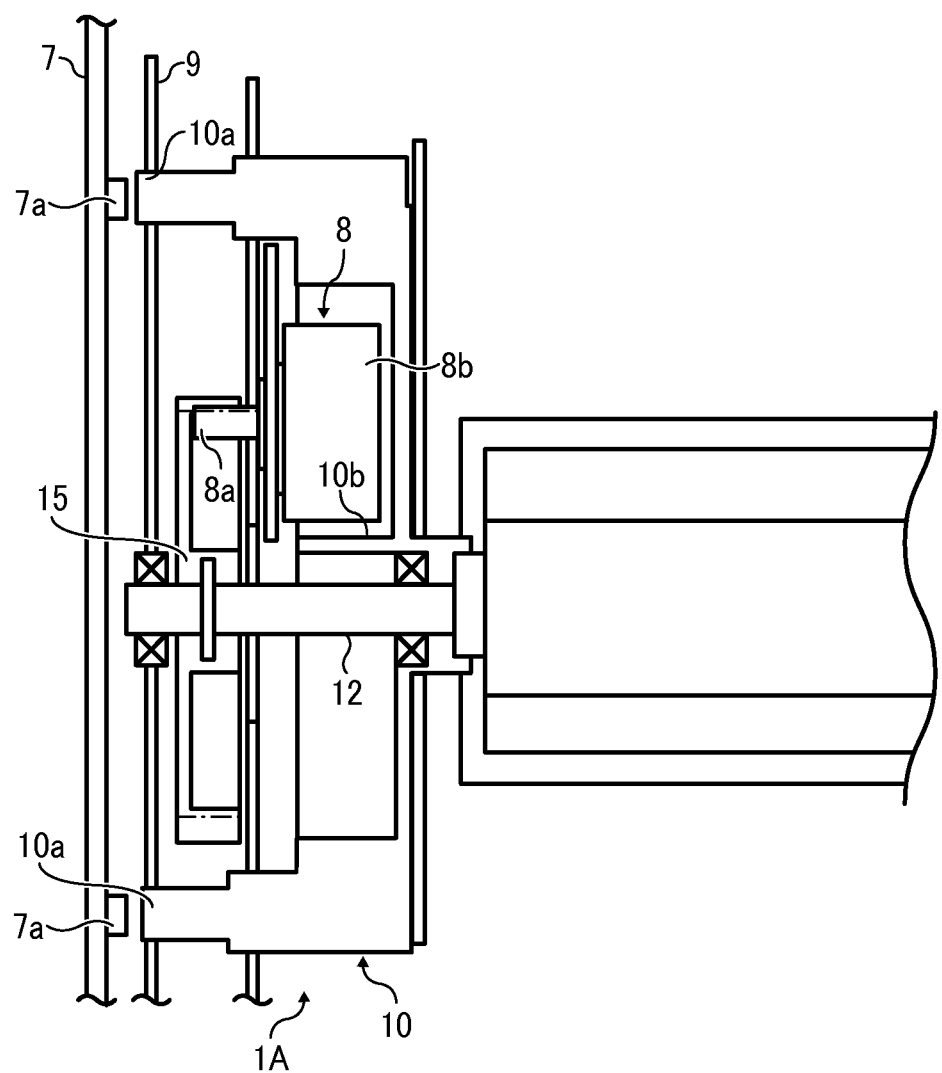
FIG. 8 is a schematic view of a driving device according to a first variation.

FIG. 8 is a schematic view of a configuration of a driving device 1A which is a first variation of the driving device 1. As illustrated in FIG. 8, the driving device 1A according to the first variation includes an internal gear 15 as a photoconductor gear. Using the internal gear 15 as the photoconductor gear allows an engagement point with the gear portion of the motor shaft 8a is covered with the internal gear 15. Such a configuration allows noise arising at the engagement point to be blocked with the internal gear 15, thus reducing leakage of noise from an exterior cover 7 to the outside. Using the internal gear 15 allows a higher engagement rate than using an external gear, thus reducing occurrence of noise and vibration. Accordingly, the quietness of the drive device is enhanced.

In the driving device 1A according to the first variation, bumping portions 7a projecting from the exterior cover 7 are disposed at positions corresponding to positioning projections 10a of the exterior cover 7. Accordingly, when the exterior cover 7 is pressed and dented inward, the bumping portions 7a bump against protruding ends of the positioning projection 10a penetrating the drive holding bracket 13. Such a configuration prevents the exterior cover 7 from contacting the drive shaft 12 and a speed reduction of the photoconductor which otherwise might be caused by an increase in torque of the drive shaft 12 due to the contact of the exterior cover 7 with the drive shaft 12.

Second Variation

Figure 9:
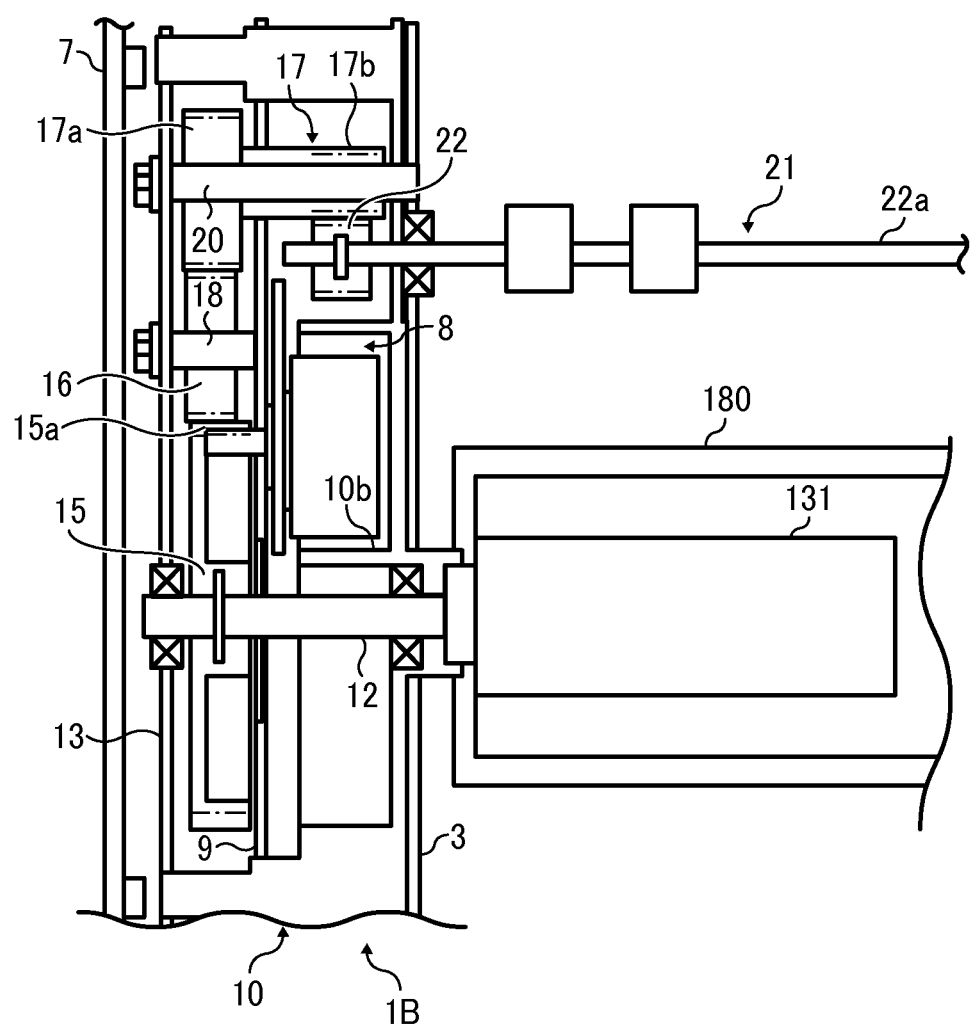
FIG. 9 is a schematic view of a driving device according to a second variation.

FIG. 9 is a schematic view of a configuration of a driving device 1B which is a second variation of the driving device 1. For the driving device 1B according to the second variation, a photoconductor 131 and a conveyance roller 21 are rotated by a drive force of a drive motor 8. In the driving device 1B, an external teeth 15a is formed at an outer circumference of an internal gear 15, to engage a first idler gear 16. The first idler gear 16 engages a first gear portion 17a of a second idler gear 17. A drive gear 22 is fixed on a roller shaft 22a of the conveyance roller 21, to engage a second gear portion 17b of the second idler gear 17.

The first idler gear 16 is rotatably supported with a first stud 18 that is held with a motor mount bracket 9 and a drive holding bracket 13. The second idler gear 17 is rotatably supported with a second stud 20 that is held with a body side plate 3 and the drive holding bracket 13.

A drive force of the drive motor 8 is transmitted to the photoconductor 131 via the internal gear 15 and a drive shaft 12, thus rotating the photoconductor 131. The drive force of the drive motor 8 is transmitted to the conveyance roller 21 via the internal gear 15, the first idler gear 16, the second idler gear 17, and the drive gear 22, thus rotating the conveyance roller 21.

The driving device 1B according to the second variation drives and rotates two rotators, that is, the photoconductor 131 and the conveyance roller 21. Such a configuration allows a smaller number of drive motors than a configuration in which the photoconductor 131 and the conveyance roller 21 are driven with separate drive motors. Accordingly, motor noise is reduced, thus enhancing the quietness of the driving device. In addition, the number of components, cost, and size of the driving device are reduced.

The second stud 20 is made of, for example, metal. Such a configuration allows the drive holding bracket 13 to be electrically connected to the body side plate 3, which is made of metal and electrically grounded. Thus, the drive holding bracket 13 is electrically grounded. The first stud 18 is also made of, for example, metal. Such a configuration allows the motor mount bracket 9 to be electrically connected to the body side plate 3 via the first stud 18, the drive holding bracket 13 made of metal, and the second stud 20. Thus, the motor mount bracket 9 is electrically grounded.

The first stud 18 is supported with the motor mount bracket 9 and the drive holding bracket 13. As described above, the motor mount bracket 9 and the drive holding bracket 13 are positioned to the mold holder 10. Such a configuration allows a smaller accumulation error of component tolerances between the motor mount bracket 9 and the drive holding bracket 13 than a configuration in which the motor mount bracket 9 and the drive holding bracket 13 are positioned to separate members. Accordingly, such a configuration prevents the first stud 18 from being supported in tilted state, thus preventing the first idler gear 16 held with the first stud 18 from being tilted. Accordingly, the first idler gear 16 smoothly engages the external teeth 15a of the internal gear 15 and the second idler gear 17, thus preventing engagement vibration and engagement noise.

The above-described embodiment and variations are limited examples, and the present invention is not limited to the above-described embodiment and variations. A variety of modifications can naturally be made as described in, for example, the following aspects.

Aspect 1

A driving device includes a drive source, such as the drive motor 8; a drive source mount, such as the motor mount bracket 9, disposed between the drive source and an exterior cover, such as the exterior cover 7, to mount the drive source; and a drive transmitter (including, e.g., the photoconductor gear 11) to transmit a drive force from the drive source to a rotator, such as the photoconductor 131. The driving device includes, as the above-described drive source, a drive source including a rotor, such as the rotor 8b, and a stator, such as a coil, inside the rotor; and a rotor cover, such as the mold holder 10, covering a periphery of the rotor. The inventors of this application have diligently studied a reason that, when an outer-rotor-type brushless motor is used, noise of the motor is sufficiently reduced. As a result, the inventors have found the following reason. Examples of noise of a drive motor include noise generated by vibration of the drive motor and noise generated by rotation of a rotor of the motor. When the motor is an inner rotor type motor, noise of a rotor of the motor is blocked with stators, such as coils and a member on which the coils are fixed, and as a result, is not so large. However, since the outer-rotor-type brushless motor has a rotor exposed to the outside, noise of the rotor is not blocked and spreads around. A part of such noise goes toward the exterior cover 7 and is sufficiently decayed by the drive source mount, such as the motor mount bracket 9, and the exterior cover 7, thus reducing noise leaking from the exterior cover 7. However, the inventors of this application have found that noise toward other areas than the exterior cover 7 may leak out from the image forming apparatus without being sufficiently decayed inside the image forming apparatus, resulting in harsh motor noise. By contrast, according to Aspect 1, the rotor, such as the rotor 8*b*, is covered with the rotor cover, such as the mold holder 10. Accordingly, a part of noise due to rotation of the rotor, which goes toward other areas than the exterior cover 7, is blocked with the rotor cover. Thus, even when the drive source having the rotor exposed to the outside is used, leakage of noise of the drive source from image forming apparatus is effectively reduced.

Aspect 2

In Aspect 1, the drive source, such as the drive motor 8, is an outer-rotor-type brushless motor. As described in the embodiment, such a configuration allows a rotator, such as the photoconductor 131, to be stable rotated at constant speed.

Aspect 3

In Aspect 1 or 2, the rotor cover, such as the mold holder 10, is made of resin, and the drive source mount, such as the motor mount bracket 9, is made of metal. Accordingly, the rotor cover, such as the mold holder 10, includes a motor shield portion, such as the motor shield 10*b*, and has a complex structure. Employing resin as the material of the rotor cover having such a complex structure allows the rotor cover to be produced by molding, such as injection molding. Such a configuration facilitates mass-production of the rotor cover with even the complex structure, thus reducing manufacturing cost and the total cost of the driving device. Employing metal as the material of the drive source mount, such as the motor mount bracket 9 enhances the noise insulation in comparison with employing resin. Such a configuration further reduces leakage of the motor noise to the outside of the driving device, thus enhancing the quietness of the drive device.

Aspect 4

In any one of Aspects 1 through 3, the rotor cover, such as the mold holder 10, includes a heat exhausting portion at a position upper than the drive source, such as the drive motor 8, and the heat exhausting portion has a labyrinth structure to exhaust heat of the drive source. As described in the above-described embodiment, such a configuration allows heat of the drive source, such as the drive motor 8, to be exhausted from the heat exhausting portion of the labyrinth structure while blocking noise of the drive source. Accordingly, the driving device according to Aspect 4 prevents the excessive high temperature of the drive source and reduces the motor noise.

Aspect 5

In any one of Aspects 1 through 4, the driving device includes a drive transmitter opposed member, such as the drive holding bracket 13, disposed opposing the drive transmitter (including, e.g., the gear portion of the motor shaft 8*a* and the photoconductor gear 11 in the above-described embodiment). The drive transmitter opposed member and the drive source mount, the motor mount bracket 9, are positioned to the rotor cover, such as the mold holder 10. As described in the above-described embodiment, such a configuration allows a smaller accumulation tolerance of components than when the drive transmitter opposing member, such as the drive holding bracket 13, and the drive source mount, such as the motor mount bracket 9, are positioned to separate members, respectively, thus allowing accurate assembly of the drive transmitter opposing member and the drive source mount.

Aspect 6

In Aspect 5, the drive transmitter includes a drive transmission member supported with the drive source mount, such as the motor mount bracket 9, and the drive transmitter opposed member, such as the drive holding bracket 13 (e.g., the first idler gear 16 supported with the first stud 18 (see FIG. 9)) or with the drive transmitter opposing member and the rotor cover (e.g., the photoconductor gear 11 supported with the drive shaft 12 (see FIG. 3)). As described in the above-described embodiment and the second variation, such a configuration allows the drive transmission member of the drive transmitter to be supported with members accurately positioned from each other, thus accurately supporting the drive transmission member without inclination. Thus, engagement vibration and engagement noise are reduced and excellent drive transmission is performed.

Aspect 7

In any one of Aspects 1 through 6, the rotor cover, such as the mold holder 10, is mounted on an electrically grounded member, such as the body side plate 3. As described in the above-described embodiment, such a configuration allows the rotor cover, such as the mold holder 10, to be electrically grounded, thus preventing electric discharge between the drive motor and the rotor cover.

Aspect 8

In Aspect 7, the driving device includes a drive transmitter opposed member, such as the drive holding bracket 13, disposed opposing the drive transmitter. The drive transmitter opposed member and the drive source mount are conductive members, and electrically connected to the electrically grounded member, such as the body side plate 3. As described in the above-described second variation, such a configuration allows the drive transmitter opposing member, such as the drive holding bracket 13, and the drive source mount, such as the motor mount bracket 9, to be electrically grounded.

Aspect 9

In any one of Aspects 1 through 8, the driving device includes a drive transmitter opposed member, such as the drive holding bracket 13, disposed opposing the drive transmitter. The drive transmitter opposed member is disposed opposing the exterior cover, such as the exterior cover 7, of the driving device. Accordingly, as described in the above-described embodiment, even when the exterior cover, such as the exterior cover 7, is pressed and bent inward, the exterior cover contacts the drive transmitter opposing member, such as the drive holding bracket 13, thus preventing the exterior cover from contacting the drive transmission member, such as the photoconductor gear 11, of the drive transmitter. Such a configuration prevents the contact of the exterior cover against the drive transmission member from applying a load to the rotation of the drive transmission member, thus allowing stable rotation driving. Accordingly, a rotator, such as the photoconductor 131, is stably driven to rotate without variation in speed.

Aspect 10

In any one of Aspects 1 through 9, the exterior cover, such as the exterior cover 7, is disposed to bump against the rotor cover, such as the mold holder 10. Accordingly, as described in the above-described variation 1, even when the exterior cover, such as the exterior cover 7, is pressed and dented inward, the exterior cover contacts the rotor cover, such as the mold holder 10, thus preventing the exterior cover from contacting the drive transmission member, such as the drive shaft 12. Such a configuration prevents the contact of the exterior cover against the drive transmission member from applying a load to the rotation of the drive transmission member, thus allowing stable rotation driving. Accordingly, a rotator, such as the photoconductor 131, is stably driven to rotate without variation in speed.

Aspect 11

In Aspect 10, the exterior cover, such as the exterior cover 7, has a bumping portion, such as the bumping portion 7a, to bump against a bumped portion, such as the positioning projection 10a, of the rotor cover, such as the mold holder 10. Accordingly, as described in the above-described first variation, even when the exterior cover, such as the exterior cover 7, is pressed and dented inward, the bumping portion, such as the bumping portion 7a, bumps against the bumped portion, such as the positioning projection 10a, of the rotor cover, such as the mold holder 10, thus preventing the exterior cover from contacting the drive transmission member, such as the drive shaft 12.

Aspect 12

In Aspect 11, the bumped portion of the rotor cover, such as the mold holder 10, is a positioning projection, such as the positioning projection 10a, to position the drive source mount, such as the motor mount bracket 9. Such a configuration simplifies the configuration of the rotor cover in comparison with a configuration in which the bumped portion is provided at a member other than the positioning projection 10a.

Aspect 13

In any one of Aspects 1 through 12, the drive transmitter includes an internal gear, such as the internal gear 15, to engage a gear portion of a drive shaft, such as the motor shaft 8a, of the drive source, such as the drive motor 8. Accordingly, as described in the above-described first variation, an engagement portion of the gear portion with the internal gear, such as the internal gear 15, is covered with the internal gear, thus blocking engagement noise with the internal gear. Such a configuration allows a higher engagement rate than an external gear, thus reducing occurrence of noise and vibration. Accordingly, the quietness of the drive device is enhanced.

Aspect 14

In any one of Aspects 1 through 13, the drive transmitter transmits a rotator, such as the photoconductor 131, removably mounted in an apparatus mounting the driving device. Such a configuration allows excellent drive transmission to the rotator, such as the photoconductor 131, removably mounted to an apparatus body.

Aspect 15

In Aspect 14, the rotor cover, such as the mold holder 10, includes a unit positioning portion, such as the unit positioning portion 10d, to position a removable unit, such as the process unit 180, including the rotator, such as the photoconductor 131. As described in the above-described embodiment, such a configuration positions the removable unit, such as the process unit 180, relative to the rotor cover, such as the mold holder 10, thus allowing excellent transmission of a drive force of the drive source, such as the drive motor 8, to the rotator, such as the photoconductor 131.

Aspect 16

An image forming apparatus includes the driving device according to any one of Aspects 1 through 15. Accordingly, an image forming apparatus capable of performing highly quiet operation is provided.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:
1. A driving device, comprising:
an exterior cover;
a first frame disposed inside the exterior cover;
a second frame disposed between the first frame and the exterior cover;
a drive source disposed inside the first frame;
a drive transmitter disposed between the first frame and the second frame; and
a third frame disposed inside the drive source.
2. The driving device according to claim 1, wherein the drive source is supported by the first frame.
3. The driving device according to claim 1, wherein the drive transmitter is supported by the second frame.
4. The driving device according to claim 1, wherein the drive transmitter is supported by the first frame.
5. The driving device according to claim 1, wherein the drive transmitter is supported by the third frame.
6. The driving device according to claim 1, wherein the drive transmitter is a gear with external teeth to engage an output shaft of the drive source.

7. The driving device according to claim 6, wherein the external teeth of the gear directly engages the output shaft.

8. The driving device according to claim 1, wherein the drive transmitter is a gear with internal teeth to engage an output shaft of the drive source.

9. The driving device according to claim 8, wherein the internal teeth of the gear directly engages the output shaft.

10. The driving device according to claim 1, further comprising a holder disposed on the third frame.

11. The driving device according to claim 10, wherein the first frame is held by the holder.

12. The driving device according to claim 11, further comprising a positioner to hold the first frame and the holder.

13. The driving device according to claim 12, wherein the positioner includes a projection of the holder and a hole of the first frame to fit the projection.

14. The driving device according to claim 10, wherein the holder includes a positioning portion to position a removable unit including a rotator driven by the driving device.

15. The driving device according to claim 10, wherein the holder is disposed on the third frame.

16. The driving device according to claim 15, wherein the second frame is held by the holder.

17. The driving device according to claim 16, further comprising a positioner to hold the second frame and the holder.

18. The driving device according to claim 17, wherein the positioner includes a projection of the holder and a hole of the second frame to fit the projection.

19. The driving device according to claim 15, wherein the holder includes a positioning portion to position a removable unit including a rotator driven by the driving device.

20. The driving device according to claim 15, wherein the first frame is held by the holder.

21. The driving device according to claim 20, further comprising a positioner to hold the first frame, the second frame, and the holder.

22. The driving device according to claim 21, wherein the positioner includes a projection of the holder, a hole of the first frame to fit the projection, and a hole of the second frame to fit the projection.

23. The driving device according to claim 20, wherein the holder includes a positioning portion to position a removable unit including a rotator driven by the driving device.

24. The driving device according to claim 15, wherein the holder is made of resin and the first frame is made of a conductive member.

25. The driving device according to claim 24, wherein the third frame is electrically grounded.

26. The driving device according to claim 24, wherein the second frame is made of a conductive member.

27. The driving device according to claim 26, wherein the third frame is electrically grounded.

28. The driving device according to claim 15, wherein the holder includes a shield to cover all directions of the drive source other than a direction of the drive source opposing the first frame.

29. The driving device according to claim 10, wherein the holder is made of resin and the first frame is made of a conductive member.

30. The driving device according to claim 29, wherein the third frame is electrically grounded.

31. The driving device according to claim 10 wherein the holder includes a shield to cover all directions of the drive source other than a direction of the drive source opposing the first frame.

32. The driving device according to claim 1, wherein the third frame is electrically grounded.

33. An image forming apparatus comprising the driving device according to claim 1.

* * * * *